INVENTOR
EARL L. NELSON
BY H. Christoffersen
ATTORNEY

INVENTOR
EARL L. NELSON
BY H. Christoffersen
ATTORNEY

United States Patent Office
3,555,518
Patented Jan. 12, 1971

3,555,518
RECORDING TRANSDUCER SELECTION LIMITER

Earl L. Nelson, Lake Park, Fla., assignor to RCA Corporation, a corporation of Delaware Filed Jan. 28, 1969, Ser. No. 794,666
Int. Cl. B41j *9/38*
U.S. Cl. 340—172.5 5 Claims

ABSTRACT OF THE DISCLOSURE

An arrangement for preventing recording transducers, each at a different position along a row, from being energized or actuated more than once during the recording of a line of characters. When a signal is generated to cause energization of a recording transducer, an indication of that event is stored and inhibits any reenergization of that transducer thereafter during recording of characters in the same line.

BACKGROUND OF THE INVENTION

In most drum and chain printers, coded information representing a character to be recorded or printed at a given print location on a document is compared with the bit codes of the print characters on the drum or chain, as those print characters are moved individually into printing position at the given print location. When correspondence exists between the coded information and the bit code, an actuating or energizing signal is generated to operate the print hammer at the given print location. This operation continues until all of the characters to be printed in a line or row have been printed. The aforementioned technique also may be employed in electrostatic printers of the type which employ a belt of character cutouts movable past or along a row of field producing elements or light producing elements. The term "recording transducer" is used here and in the appended claims in a generic sense to include print hammer assemblies, field or light producing elements, and other selectable devices which effect recording, e.g., printing.

A problem often encountered during printing is the multiple selection and actuation of any one or more recording transducers, that is, the actuation of a transducer more than once during the printing of a row of characters. Multiple selection may be caused, for example, by code errors during transmission, by hardware failure and/or by signal transients. When different characters are printed at the same location, the resulting print is illegible. On the other hand, some characters are repeated more than once on some drums and chains. In that event, the same character may be printed at a location a number of times, resulting in nonuniform density of printing. In chain printers and in skewed drum printers, multiple selection of a print hammer or hammers may result in hammer damage, fuse failure, and excessive loading of the printer's power supply.

BRIEF SUMMARY OF THE INVENTION

A preferred form of the invention includes means for storing an indication that a recording transducer has been selected, and means responsive to the stored indication for inhibiting the reselection of that transducer during further printing in the same print row.

DETAILED DESCRIPTION

Although the invention has application in many different types of printer systems, e.g., drum printers, chain printers, and electrostatic printers employing character belts, the invention is illustrated and described herein the setting of a skewed print drum system. In particular, the invention is illustrated in a system which is generally similar to that illustrated and described in U.S. Pat. 3,406,381, issued to Robert C. Peyton and assigned to the assignee of the present application.

Figure 1:
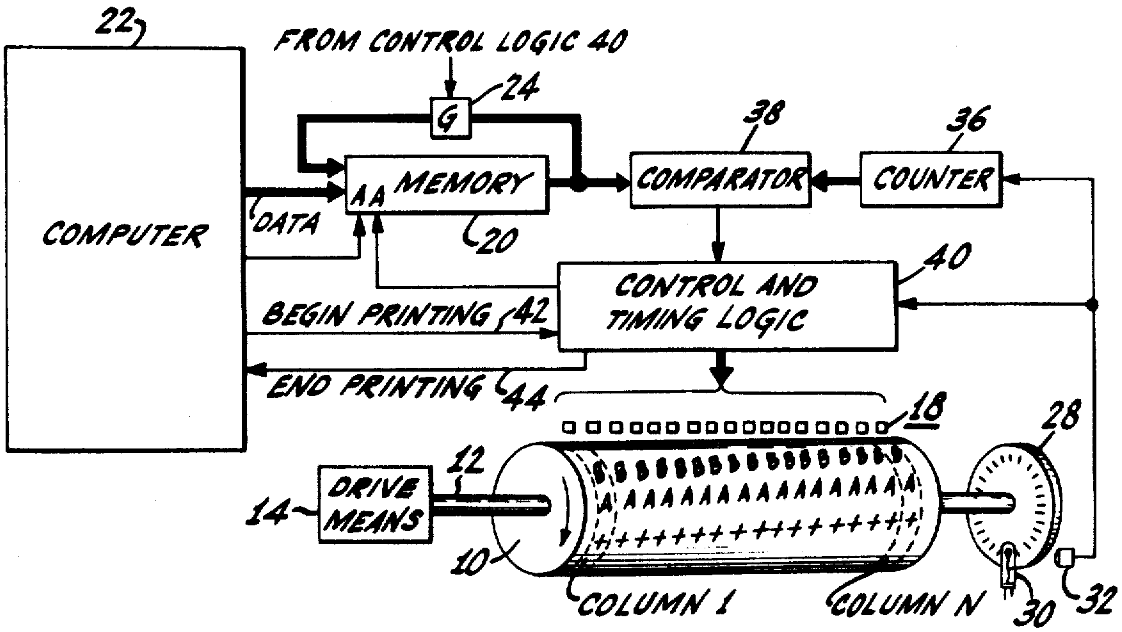
FIG. 1 is a block diagram of a printer system in which the invention may be practiced.

In the skewed print drum system of FIG. 1, a print drum or cylinder 10 is mounted on a shaft 12 and rotated by a drive means 14, e.g., a synchronous motor or a motor with speed maintained within tight tolerance. Drum 10 has a large plurality of raised type characters thereon arranged in M rows and N columns. All of the type characters of a column are arranged in spaced relation in a peripheral ring on the drum normal to the axis 12. Each peripheral ring contains a large number of different characters, although some characters may appear more than once. The N type characters in a row are identical, and are equally spaced along the row to provide columns of equal width. As may be seen in FIG. 1, the rows of type characters are skewed relative to the print columns and to the axis 12. Each of the rows is identically skewed, and the distance between adjacent rows is a constant. The angle of skew and the distance between adjacent rows are chosen so that the type characters of a row are presented to a row of recording transducers in sequence, beginning with the type character in column 1 and ending with the type character in column N, and with the type character in column N being presented to its transducer before the type character in column 1 of the next row is presented to its transducer.

Transducer assembly 18 includes N recording transducers, e.g., print hammers and associated solenoids, there being one transducer for each column of type characters. The hammers (not shown) are aligned in a row parallel to the axis 12 of the drum and are disposed opposite their respective columns of type characters. In the deenergized state of the hammer solenoids, the hammers are spaced a slight distance from the drum 10 to define an area for receiving a recording medium, e.g., a document or paper stock, to be printed.

Information or data in the form of binary characters corresponding to the characters to be printed on a line (or row) of the recording medium are stored in a data store or memory 20, and may be supplied to the memory from a computer 22 or other source. By way of example only, data store 20 may take the form of a bank of shift registers of N stages each, there being one shift register for each bit of a character. The shift registers may be connected as a recirculating memory by connecting the outputs of the several banks of shift registers to the inputs thereof by way of gates 24, there being one gate for each shift register. The outputs of the gates 24 and the data input from the computer 22 may be supplied to the inputs of the shift registers through OR gates (not shown). The heavy black connecting lines in FIG. 1 indicate multichannel cables or connectors.

Mounted on the axis 12 of the print drum, at the right end thereof, is a timing disk 28 which may take the form of an opaque disk having transparent areas or slots therein arranged in a ring concentric with the axis. There is one slot for each row of type characters on the drum 10. A light source 30 is located on one side of the disk adjacent the ring of slots, and a photo-pickup device 32 is located on the opposite side of the disk. As the axis 12 turns, the various slots pass sequentially between the light source 30 and the pickup device 32 to generate a sequence of pulses, there being one pulse for each row of type on the drum. The slots are so located on the disk 28 that the slot for any row of characters on the drum passes between the light source and the photo-pickup device as the type character in the first column (column 1) of that row is moving into printing position opposite its respective recording transducer.

The output of the photo-pickup device 32 is applied to the input of a counter 36. The output of the counter is the printer bit code, i.e., a binary character equivalent of the type character then in printing position. This output may be considered to be a "search" character, since it is desired to search for that binary character in the memory 20. The output of counter 36 is applied to a comparator 38. Alternatively, a coded disk could be employed to supply print bit codes directly to the comparator 38 without the need for counter 36. The characters in the data store 20 are supplied to the comparator 38 character-by-character for comparison with the output of counter 36. For each identity, comparator 38 sends an input signal to the block 40 labeled "Control and Timing Logic." This unit 40 also receives each output of the photo-pickup device 32.

In general terms, the printer system may operate as follows. Computer 22 sends to the memory 20 a series of binary characters corresponding to the characters which it is desired to print on a line of the recording medium. The computer 22 also may send a signal to the advance (A) input of the memory with each character to step the information along in the shift registers. When the memory is filled and the recording medium has been shifted to the proper position, etc., the memory sends a signal to the control and timing logic on line 42 to signify that printing may begin.

As the next timing signal is generated by the disk 28 (at the beginning of a row of type characters), the Control and Timing Logic 40 supplies a series of pulses to the advance terminal of the memory 20 to read out the memory a character at a time to the comparator. Gates 24 in the recirculation loop are open at this time to allow the contents of the memory to recirculate. The pulses applied to the advance terminal of the memory are equally spaced timewise, so that the successive characters applied to the comparator occur in successive equal time periods. Drum 10 rotates at such a speed that the successive type characters of a row are presented to their respective transducers during successive ones of the time periods.

Inasmuch as the rows of type on drum 10 are skewed, the same print character is presented to the hammer in columns 1 . . . N in sequence. The control logic 40 must supply energizing signals to the solenoids of selected hammers in the proper sequence timewise. As mentioned previously, the comparator 38 sends an input signal to the control logic 40 each time the memory 20 output corresponds to the output of the counter 36. The Control and Timing Logic 40 functions to energize the appropriate hammer solenoid in response to an output from the comparator. An indication is stored each time an energizing signal is generated, and a stored indication prevents the corresponding solenoid from being energized a second time during further printing in the same print line. After the entire row of characters has been printed, the Control and Timing Logic signals the computer 22, via line 44, that the system is ready to receive information for the next line of print. Also, unit 40 disables the gates 24 in the recirculation loop at the end of a line of printing to prevent the memory 20 contents from recirculating as the next line of information is sent from computer 22 to the memory.

Figure 2:
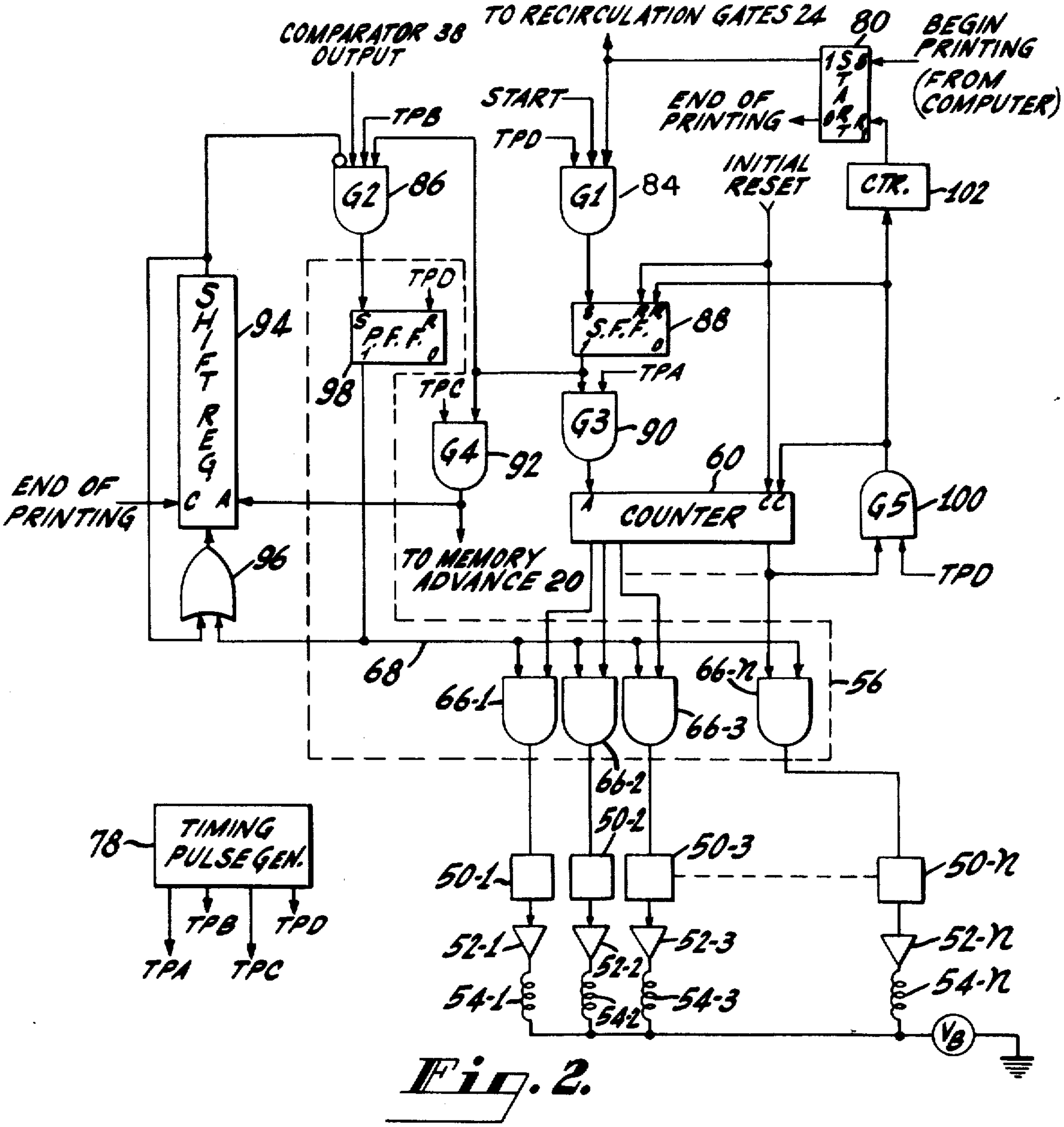
FIG. 2 is a block diagram of the control logic in which the invention is embodied.

FIG. 2 is a block diagram of a Control and Timing Logic network 40 embodying the invention which may be used in a system of the type mentioned immediately hereinabove. This network comprises N one-shot or monostable circuits 50–1, 50–2 . . . 50–N, the outputs of which are coupled via amplifiers 52–1 . . . 52–N to the solenoids 54–1 . . . 54–N, respectively, for the hammers associated with columns 1 . . . N, respectively, of print drum 10.

A counter 60 controls the selective triggering of these one-shots via a logic arrangement 56. The counter, which is capable of counting at least to N, may be a ring counter, binary counter, etc. When the counter is a ring counter, the outputs of counter 60, which are energized sequentially for counts of 1 . . . N, are applied to coincidence gates 66–1 . . . 66–N, respectively, the outputs of which are coupled to the one-shots 50–1 . . . 50–N, respectively, as illustrated. A second input to each of the gates is connected to a line 68. When this line is energized, that one of the one-shots designated by the count in counter 60 is triggered to produce an output signal of predetermined duration for energizing its associated hammer solenoid.

It will be understood that other types of counters could be employed with suitable change in logic. For example, a binary counter could be used, with a decoder at the outputs thereof. Counter 60 is initially cleared to a reference state, e.g., a count of zero, when power is first turned on in the system.

Figure 3:
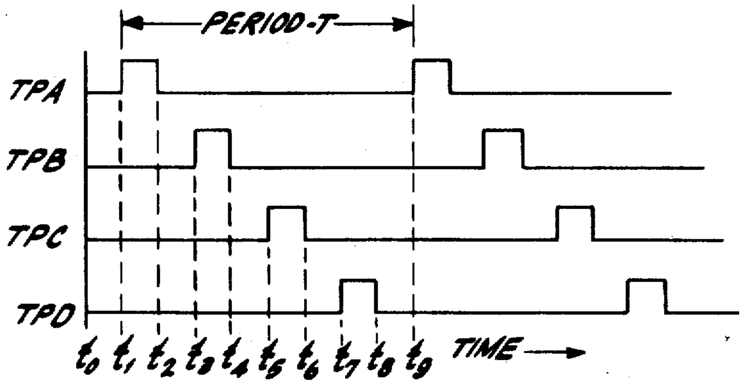
FIG. 3 is a timing pulse generator output timing diagram.

A timing pulse generator 78, such as a crystal controlled oscillator and supporting circuitry, generates continuous, successive sets or sequences of timing pulses, wherein each sequence has four timing pulses TPA, TPB, TPC and TPD. The timing relationship of successive sequences and individual timing pulses is illustrated in the diagram of FIG. 3. As shown there, the timing period for each set of timing pulses is T. Since each of the several pulses of a set occurs only once each timing period, the frequency of the pulses TPA (or TPB, etc.) is $f=1/T$.

Drum 10 is rotated at such a speed that each type character in a row is in printing position approximately for a period T. Thus, a first set of timing pulses TPA . . . TPD is generated as the type character in column 1 of a drum row passes through printing position, a second set of timing pulses is generated as the type character in column 2 of that row passes through printing position, etc. As will be described, one pulse of each timing pulse set is used to advance the memory 20, one pulse of a set is used to advance or trigger the counter 60, etc., whereby synchronism is maintained throughout the system.

Computer 22 (FIG. 1) sends a signal to the control unit 40 via line 42 when data store 20 has been filled, etc., to signify that printing can begin. This signal sets a START flip-flop 80 to energize the (1) output thereof. This output opens the gates 24 in the recirculation loop of data store 20, and also primes one input of a first coincidence gate 84. A START signal (output of photo-detector 32, FIG. 1) primes a second input to first gate 84 during the time period T next prior to the timing period when a type character in column 1 of the drum is in printing position. At TPD, first gate 84 becomes fully enabled and sets a SET flip-flop 88. It should be noted that it is immaterial which character or row of characters is moving into print position.

When SET flip-flop 88 is in the set condition, its (1) output primes an input of a third coincidence gate 90 and allows the TPA pulses to be applied to the ADVANCE input terminal of first counter 60. Since only one TPA pulse is generated during each timing period, and since the first TPA pulse applied to the counter 60 occurs during the period when a type character in column 1 of the drum is in printing position, it may be seen that the count in counter 60 always corresponds to the hammer associated with the drum column whose type character is in printing position. The (1) output of SET flip-flop 88 also primes one input to second gate 86 and one input to a fourth gate 92.

The binary character designating the character to be printed in column one is presented by data store 20 (FIG. 1) to the comparator 38 when a type character in column one of the drum is in printing position. (Counter 60 stores a count of one at that time.) Assume that the type character corresponds to the binary character whereby the comparator sends a signal to the second coincidence gate 86. A third input to this gate is the inverted output of an N stage memory, shown as a recirculating shift register 94, inversion being indicated by the small circle at the gate input. Viewed in another way, this input inhibits the gate when the shift register is providing a "1" output. At this particular time all stages of the register are in the reset state, whereby the output thereof does not inhibit second gate 86. Therefore, at TPB of the first timing period, gate 86 becomes fully enabled and its output sets a PRINT flip-flop 98. The (1) output of this flip-flop primes one input of each of the coincidence gates 66–1 . . . 66–N in the logic arrangement 56. Since counter 60 is storing a count of one at this time, gate 66–1 becomes fully enabled and triggers the one-shot 50–1 to energize associated solenoid 54–1 for a predetermined period of time. This solenoid in turn, drives the hammer associated with the first column of the drum.

The (1) output level of PRINT flip-flop 98 also passes through OR gate 96 to the input network of the N stage shift register 94. A second input to this OR gate is the output of the register, whereby the register is a recirculating shift register. At TPC, fourth gate 92 becomes enabled and advances the data one position in shift register 94. The "1" output of OR gate 96 is entered as a binary "1" bit into the bottom stage of the register at this time. This stored "1" bit is an indication that the hammer assembly in the first column position was selected and energized, and the stored indication is used to prevent or inhibit a reselection of that hammer assembly until the completion of printing on that line of the document, i.e., until the next print line. This will be described in more detail hereinafter.

The TPC pulse output of fourth gate 92 also is applied to the advance terminal of memory 20 (FIG. 1). The memory contents is advanced one position each timing period by a TPC pulse, whereby the output of memory 20 always designates the character to be printed in the column whose type character is moving into, or is in, printing position. At TPD the PRINT flip-flop is reset.

The print characters in columns 2 . . . N of the same row of drum 10 move successively into print position during successive ones of the next N–1 timing periods. Operation of the system during each of these next N–1 timing periods is similar to that described above, except that successive ones of the gates 66–2 . . . 66–N are primed by the output of counter 60 during successive time periods. In particular: each TPA pulse advances counter 60; each TPB pulse sets PRINT flip-flop 98 if the comparator 38 produces an output during that timing period; each TPC pulse passes through fourth gate 92 to advance the shift register 94 and the memory 20 (FIG. 1); and each TPD pulse resets PRINT flip-flop 98. Each time that the PRINT flip-flop 98 becomes set, that one-shot 50–1 . . . 50–N designated by the counter 60 is triggered, the associated print hammer is fired, and a "1" bit is entered into the bottom stage of shift register 94 by the TPC pulse.

At the end of the TPC pulse of the $N^{th}$ set of timing pulses (the $N^{th}$ timing period), measured from the time SET flip-flop 88 became set, the entire contents of data stored 20 (FIG. 1) has been read out once and recirculated. Also, shift register 94 is storing indications of those hammer solenoids which were selected and energized during the first N timing periods. More specifically, for each of the first through $N^{th}$ solenoids 54–1 . . . 54–N that was selected for printing, a "1" bit is stored in the corresponding one of the first through $N^{th}$ stages of register 94, where the first stage is the output stage and the $N^{th}$ stage is the input stage. Also, at this time counter 60 stores a count of N. The counter output then is priming one input of a fifth coincidence gate 100. This gate becomes fully enabled at TPD and (a) clears counter 60 to a count of zero, (b) resets SET flip-flop 88, and (c) triggers a second counter 102. When the flip-flop 88 becomes reset no further timing pulses are applied to the counter 60, to the memory 20 and shift register 94 advance terminals, or to the PRINT flip-flop 98.

When the type character in the first column of the next row of drum 10 (FIG. 1) approaches print position, photo-detector 32 triggers the printer bit code counter 36 to supply a new "search" character to the comparator 38. The detector 32 output also supplies the START input to first coincidence gate 84 (FIG. 2). At TPD, gate 84 becomes fully enabled and sets SET flip-flop 88 to initiate a new print cycle. This print cycle is similar to the first print cycle just described in detail hereinabove, with this important difference. Shift register 94 now is storing "1" bits in those of its stages which correspond to printer solenoids which were selected and energized during the first print cycle. A "1" at the output of the register 94 inhibits second concidence gate 86 and prevents the TPB pulse from passing therethrough to set the PRINT flip-flop 98. Since the register is advanced each time period, and the contents thereof recirculated, its output always "corresponds" to the one-shot and solenoid designated by the counter 60 at time TPB. As a consequence, a one-shot once triggered cannot be triggered again during a later print cycle for the same print line and, thus, a printer solenoid cannot be reselected.

Of course, other printer solenoids can be selected during the second print cycle, in which case a "1" bit will be entered into the register 94 for each newly selected solenoid. At the end of the TPC pulse of the $N^{th}$ timing period of the second cycle, register 94 will be storing a "1" in each of the stages therein which correspond to solenoids selected during the first and second timing cycles. Counter 60 stores a count of N at this time and its output enables one input of fifth coincidence gate 100. At TPD, gate 100 becomes fully enabled and (a) sets counter 60 to zero, (b) resets SET flip-flop 88, and (c) triggers second counter 102.

The system now is ready for the third timing cycle. This cycle and succeeding cycles are similar to those described and will not be discussed further except to note that a "1" bit is entered into register 94 each time a new solenoid is selected. Also, the "1" bits therein always prevent reselection of previously selected solenoids.

At the end of the $M^{th}$ print cycle (assuming M rows of characters on drum 10) second counter 102 reaches a count of M. Its output then resets START flip-flop 80 to terminate the printing operation. In particular the (0) output thereof clears register 94, and also signals the computer 22 that the entire line of data has been printed; the (1) output blocks first coincidence gate 84 and the gates 24 (FIG. 1) in the memory 20 recirculation loop. The next row of information to be printed then may be read into the memory 20 from the computer 24.

Although the memory 94 has been illustrated in FIG. 2 and described as a recirculating shift register, it should be mentioned that other suitable devices could be used instead. One example is a recirculating delay line with associated logic. A core memory with common sense line also could be used, with each different storage location corresponding to a different solenoid or recording transducer. What is of importance is that an indication be stored for each solenoid selected, and that the stored indications prevent reselection of corresponding solenoids.

What is claimed is:

1. The combination comprising:

a plurality of recording transducers positioned to record a line of characters;

selection means coupled to said transducers for energizing said transducers selectively;

means responsive to the selection of a transducer for continuously storing an indication during the recording of said line of characters that that transducer was selected; and means coupling said indication storing means to said selection means responsive to said stored indication for preventing the reselection of the associated recording transducer during further recording in the same line.

2. The combintion as claimed in claim 1, wherein said means for continuously storing an indication is a recirculating memory having its input connected to receive a signal whenever any transducer is selected, and having its output applied to disable said selection means.

3. The combination comprising:

a plurality of recording transducers positioned to record a line of characters;

selection means coupled to said transducers for energizing said transducers selectively in a predetermined sequence;

a recirculating memory having an input responsive to the selection of a transducer for storing an indication that that transducer was selected and having an output; and means coupled to said recirculating memory output responsive to a stored said indication for preventing the reselection of the otherwise energizable associated recording transducer during further recording in the same line.

4. The combination as claimed in claim 3, wherein the cycling time of said recirculating memory is at least as long as the period for one sequencing of said recording transducers.

5. The combination as claimed in claim 3 wherein said recirculating memory is a shift register having its output coupled to its input, and means for advancing said shift register at the same rate as the sequencing of said transducers.

References Cited

UNITED STATES PATENTS 3,406,381 10/1968 Peyton ........... 340—172.5
3,467,005 9/1969 Bernard ............. 101—93

PAUL J. HENON, Primary Examiner

P. R. WOODS, Assistant Examiner

U.S. Cl. X.R.

101—93